United States Patent [19]

Wilde

[11] Patent Number: 5,512,285

[45] Date of Patent: Apr. 30, 1996

[54] FRAGRANCE EXTRACTION

[75] Inventor: Peter F. Wilde, Thirsk, United Kingdom

[73] Assignee: Advanced Phytonics Limited, Manchester, England

[21] Appl. No.: 195,786

[22] Filed: Feb. 14, 1994

[30] Foreign Application Priority Data

Feb. 22, 1993 [GB] United Kingdom .................... 9303546

[51] Int. Cl.$^6$ .................................................. A61K 35/78
[52] U.S. Cl. .......................................... 424/195.1; 514/783
[58] Field of Search ........................... 424/195.1; 514/783

[56] References Cited

U.S. PATENT DOCUMENTS

| | | | |
|---|---|---|---|
| 3,649,296 | 3/1972 | Friedman et al. | 99/71 |
| 3,769,033 | 10/1973 | Panzer et al. | 426/428 |
| 3,828,017 | 8/1974 | Finley et al. | 260/112 |
| 4,278,012 | 7/1981 | Wheldon et al. | 99/278 |
| 4,282,250 | 8/1981 | Wheldon et al. | 426/231 |
| 4,367,178 | 1/1983 | Heigel et al. | 260/403 |
| 4,490,398 | 12/1984 | Behr et al. | 426/312 |

FOREIGN PATENT DOCUMENTS

| | | |
|---|---|---|
| 0234680 | 7/1980 | European Pat. Off. . |
| 2818852 | 11/1978 | Germany . |
| 3011185 | 10/1981 | Germany . |
| 1557123 | 12/1979 | United Kingdom . |
| 2072189 | 1/1981 | United Kingdom . |
| 2225205 | 5/1990 | United Kingdom . |

Primary Examiner—Douglas W. Robinson
Assistant Examiner—Howard C. Lee
Attorney, Agent, or Firm—Nikaido, Marmelstein, Murray & Oram

[57] ABSTRACT

An improved process for extracting an organic component, including fragrant, flavorsome or pharmacologically active components, from an organic material of natural origin using tetrafluoroethane in the liquid phase as the solvent. The process essentially includes contacting the organic material with the tetrafluoroethane in its liquid phase, charging thereby the tetrafluoroethane with the organic component, collecting the mixture thereof, and removing the tetrafluoroethane therefrom so as to isolate the organic component. The process allows the more volatile components of plant derived materials, frequently lost by conventional methods of extraction, also to be extracted. The extracted components, as a result, bear a greater similarity to, and possess a larger number of the characteristics of the original material than conventionally obtained extracts.

10 Claims, No Drawings

FRAGRANCE EXTRACTION

The present invention relates to an improved method for the extraction, concentration and preservation of fragrances and flavors from natural materials. Natural materials with which the present invention is concerned include: flowers, seeds, bark, buds, roots, leaves, fungal mycelia, moulds, algae and lichens.

For many generations man has sought to obtain and preserve the essential ingredients of natural products (buds, roots and leaves, but other flavorsome and fragrant natural materials may be successfully extracted) which are responsible for their characteristic aroma, fragrance, flavor and pharmacological properties. The motivation for obtaining those essential fragrances arose for many different reasons; for example, ancient civilizations used special fragrances for religious ceremonies. Later, fragrances found application in personal and domestic hygiene.

Many plants have been used as sources of pharmacologically active preparations for example antibiotics and there is considerable and growing demand for an even more diverse range of plant extracts of high quality and integrity. The widespread use of flavoring to improve taste and smell of foods has been long appreciated, whilst being somewhat limited by the confines of available technology.

One reason for the deterioration of concentrated fragrances over time is their volatility. The transmission of volatile fragrant molecules through the air from their source to the recipient's nose allows the recipient to perceive a scent. Similarly, their capture by the palate is perceived as a flavor. Hence, loss of volatile fragrant components from an aromatic oil greatly reduces its quality.

Drying was probably the earliest attempt to preserve aromas and flavors so that they were available all the year round. Some fragrances and flavors can be preserved well by drying. Many seeds for example dry naturally whilst preserving much of their fragrance and flavor. However, some of the most precious aromatic materials in plants are actually gases at room temperature and pressure, for example the compounds responsible for the lachrymatory components of horse radish and onion and the aroma of freshly ground roasted coffee beans. Most of the other delicate components of a natural flavor or fragrance are highly volatile liquids, and many of these materials are more volatile (having a higher vapor pressure) than water hence they evaporate faster than water. Consequently, whilst drying might be a valuable way of conserving the aroma in some plant products (for example; bay leaves, garlic, cinnamon), it is not a sensible way of preserving the aroma of others, and the resulting dried materials are often a poor alternative to the fresh material. Herbs such as parsley, mint and chives which have been dried are often disappointing to say the least, and dried jasmine and hyacinth flowers actually smell rather disgusting.

Later, the Greeks and Romans realised that the fragrant materials present in flowers were actually oils or oil soluble. Hence fragrant materials lend themselves to extraction with oil or other fat solvents. The Romans obtained cosmetic fragrant oily preparations by stirring fresh flowers with olive oil, animal fats and other greasy materials to extract the fragrant components of the flowers into the olive oil etc. For example, "stymata" (a liquid), "hedysmata" (a semi solid unguent) and "diapasmata" (a powder) were prepared from fragrant roses.

The principle of distillation, which has been practiced for at least 800 years, is still the major technique for the preparation of a variety of fragrant and flavor oils. Distillation has the disadvantage that it requires the burning of vast quantities of expensive fossil fuels to produce the necessary heat to boil the water and produces huge quantities of boiling liquid effluent. Furthermore, all the water needed for condensing the steam (and oil) is also discarded as hot effluent. Thus a large amount of heat energy is wasted in this process. The oils produced from plant materials which have been distilled are, of course, cooked at 100° C. and are therefore damaged, the thermolabile components having been destroyed and "off-notes" or burnt components having been introduced.

An extraction process known as maceration has also long been known. In this process, fresh fragrant flowers are stirred into molten lard whereupon the fragrant oils dissolve in the molten lard. However, the fragrant oils obtained in this process are often of poor quality due to thermal decomposition and loss of the more volatile components to the atmosphere.

Alternatively, flowers and their oils which could not tolerate the temperature of molten lard were pressed into solid lard coated onto glass plates ("chasis") at room temperature over several days. Their fragrant oils diffused into and dissolved in the lard in a process known as "enfleurage". Thermal decomposition and evaporation were thus reduced to a minimum. The flowers were regularly replaced until the lard became saturated with oil ("pomade"). This process suffers the disadvantage of being very labor intensive and hence expensive. Furthermore, even though the extraction of the fragrance was effected under ambient conditions there was inevitably some spoilage of the fragrances obtained since the pomade was then treated with alcohol, as discussed below, to preferentially dissolve the fragrance, and the alcoholic solution of the fragrance concentrated by removal of alcohol.

In both the processes of maceration and enfleurage the recovery of the oil ("absolute") from the lard required its extraction with strong alcohol. The "absolute" flower oil preferentially dissolved in the alcohol and was then concentrated by distillation of the alcohol. However, these "absolutes" are often damaged by such treatment on account of their volatility or heat sensitive nature and hence neither maceration nor enfleurage is entirely satisfactory for the extraction of fragrances.

More recently, the availability of synthetic solvents such as perchloroethylene and methylene chloride and fractions of petroleum such as hexane has caused the obsolescence of maceration and enfleurage. Methylene chloride (dichloromethane) and hexane are now very widely used for the extraction of flavor and fragrance oils and pharmacologically active principles from plant materials. For example, methylene chloride has been used for a number of years in the extraction of caffeine from coffee and tea. However, it is not always desirable or acceptable to have trace amounts of these solvents remaining in extracted material after isolation in view of the toxicity of these solvents.

A more recent approach has been to employ super-critical carbon dioxide as a solvent. In this process, carbon dioxide gas at temperatures of 39° C. or more (its critical temperature) and at pressures between 200 and 500 bar, usually 350 bar (5250 psi), is capable of removing caffeine from coffee and tea. Some fragrant/flavor oils are also removed under these conditions. Passing such super-critical carbon dioxide through tubes packed with fragrant or flavorsome materials can strip the fragrance or flavor from the raw material and into the fluid stream. Allowing the pressure of the gas thereafter to fall to 100 bar or less, deprives it of its ability to dissolve these oils and they precipitate from the fluid stream and can be collected. The low pressure carbon dioxide may then be re-compressed and recycled or simply discarded. Furthermore, it is found that the pressure of the carbon dioxide gas during the extraction of the fragrances or flavors can, to some extent, affect the exact nature of the components extracted. This solvent is therefore partly selective. Low pressure $CO_2$ (200 bar) selectively extracts more volatile materials, but in lower yields, than high pressure $CO_2$ (350–500 bar) which extracts the remaining less volatile materials, in higher yield.

The disadvantage of this process is that the equipment required to carry out the process is massive and exceedingly costly due to the working pressures involved. Furthermore, the cost of scaling up of such equipment is prohibitive hence the equipment tends to remain small scale whilst still not being easily transportable. In addition, super critical $CO_2$ extraction systems must operate at temperatures in excess of 39° C. and holding labile fresh natural materials at such temperatures for long periods during processing may well result in thermally or enzymically induced spoilage. Also, the pH of the aqueous phase of wet, fresh flowers is reduced to very low values during extraction of aromas or flavors using high pressure $CO_2$ and the resulting low pH may cause damage to the extracted material by acid hydrolysis. Consequently, only very valuable oils or raw materials with a very high oil content (or low water content or high bulk density) can be economically produced in such equipment. Nevertheless, the resulting products are usually excellent.

Butane has also been used to extract fragrant oils from fresh plant materials. Butane has a boiling point of −0.5° C. at atmospheric pressure and therefore has advantages over solvents such as hexane (boiling point 60° C.) when its removal from a solution of fragrant oils is undertaken. Its removal causes less loss of the light, volatile, fragrant components than does the removal of hexane. However, the flammability of liquified hydrocarbon gases such as butane, renders their routine handling by process plant operators, extremely hazardous. Leakage of even minute quantities of these odorless flammable gases constitutes a potential risk of incineration to the operators and their equipment. Thus, extraction with such hydrocarbon solvents is not really practicable.

Attempts to obtain fragrant oils have recently focused upon methods of extraction of the natural materials with a wide variety of organic solvents. It is an improved way of accomplishing this procedure which forms the basis of this specification.

Ideally a natural scent or flavor appropriate for extraction by the method of the present invention should have the following features:

1) It should be as highly concentrated as is possible.
2) It should contain as little material which does not contribute to the aroma or flavor as is possible.
3) It should closely resemble the aroma or flavor of the original raw material.
4) It should be economical to produce.

As they have become more readily available, those organic solvents which are volatile liquids at room temperature enabled aim 1) to be met. However, known methods do not compare with the efficacy of the present invention in satisfying the criteria 2), 3) and 4). It is relatively easy to separate solutions of the above organic solvents from the extracted flowers once dissolution of the fragrant flower oils has occurred, and they may be easily evaporated to concentrate the solute, leaving a concentrated residue (or 'concrete' behind). Unfortunately, the boiling point of the most popular organic solvents is frequently higher than that of the desired fragrance or flavor. Hence many of the volatile components are lost during evaporation of the solvent and criterion number 3) cannot be met. Furthermore, heating the solution containing the flavor, fragrance or pharmaceutically active principle to its boiling point (60° C. in the case of hexane) contributes to a further reduction in the quality as a result of thermal degradation of the extracts. In contrast, many of the solvents used in the present invention have much lower boiling points enabling the extraction process to be carried out at or below ambient temperature; the removal of solvent after extraction is also facilitated as a result of their low boiling points.

Vacuum distillation can reduce the apparent boiling point of a high boiling hydrocarbon solvent such as hexane thereby reducing the thermal degradation of a fragrant oil dissolved in it, nevertheless it does nothing to alleviate the 'stripping' of volatile components of the flavor or fragrance into the vapor phase whilst under reduced pressure. Hence those components are lost in the extraction process. It is thus desirable to use a solvent which has a boiling point substantially lower than that of the most volatile component of the fragrance and below the thermal decomposition temperature of any pharmacologically active principle. Even more ideally, the solvent should be selective inasmuch as it is able to dissolve only the pure fragrant oils (absolutes) from the original plant raw material leaving as many undesirable components behind as possible. In the case of roses, for example, apart from the spent flowers themselves, these impurities are mainly waxes. The use of a selective solvent would eliminate the need for further alcoholic treatment of the extract, saving considerable expense and eliminating any chance of further deterioration of the fragrance quality.

The present invention utilises non-chlorinated fluorocarbon solvents which have been developed as a replacement for CFC's such as dichlorodifluoromethane and which are presently only employed in the refrigeration industry. They have the benefit of being 'ozone' friendly, unlike CFC's.

According to the present invention, there is provided a process for extracting one or more components from material of natural origin, the process comprising the steps of:

a) contacting the material with a non-chlorinated fluorinated hydrocarbon solvent in the liquid phase so as to charge the solvent with the component, b) collecting the charged solvent, and c) removing the solvent to isolate the component.

In one embodiment of the invention the material is contacted with the solvent in an extraction vessel after the vessel has been sealed and air has been removed. The resulting mixture of the solvent and the material is maintained under pressure so that the material and the solvent are in intimate contact and the solvent is charged with the component.

An apparatus which can be used when carrying out the method of the invention includes an extractor which may be sealed and evacuated of air as required, and which may be connected to a source of the solvent, in the form of liquid, to enable the extractor to be filled with liquid solvent. The extractor may be made of stainless steel or the like and is able to withstand elevated or reduced pressures.

The extractor communicates with and may be isolated from an evaporator via a suitable arrangement of pipework. During evaporation of the solvent the solvent is allowed to pass intermittently from the extractor to the evaporator in order to maintain a level of liquid and a gas-filled headspace in the evaporator. Evaporation of the solvent is achieved by withdrawal of gaseous solvent from the headspace of the evaporator, and in an embodiment of the invention the outlet of the evaporator is connected to the inlet side of a compressor to reliquefy the solvent.

The evaporator may also be provided with a source of heat to control the temperature of the evaporator during evaporation of the solvent. In another embodiment of the invention the heat source may be thermostatically controlled to provide a constant evaporation temperature.

The compressor may return liquefied solvent to a solvent reservoir, which may also act as the source of solvent for the extractor, or the liquefied solvent may be recycled to the extractor.

Of particular interest is the solvent tetrafluoroethane, and in particular 1,1,1,2-tetrafluoroethane (R134A).

Other suitable solvents which may be employed in the process of the present invention include: $CF_3H$ (HFC-23, trifluoromethane), $CH_3F$ (HFC-41, fluoromethane), $CH_2F_2$ (HFC-32, difluoromethane), $CF_3CF_2H$ (HFC-125, pentafluoroethane), $CF_3CH_3$ (HFC-143 A, 1,1,1-trifluoroethane), $HCF_2CH_3$ (HFC-152 A, 1,1-difluoroethane), $CF_3CHFCF_3$ (HFC-227 EA, 1,1,1,2,3,3,3-heptafluoropropane), $CF_3CF_2CF_2H$ (HFC-227 CA, 1,1,1,2,2,3,3-heptafluoropropane), $CF_3CH_2CF_3$ (HFC-236 FA, 1,1,1,3,3,3-hexafluoropropane), $CF_3CF_2CH_3$ (HFC-245 CB, 1,1,1,2,2-pentafluoropropane), $CF_3CF_2CH_2F$ (HFC-236 CB, 1,1,1,2,2,3-hexafluoropropane), $HCF_2CF_2CF_2H$ (HFC-236 CA, 1,1,2,2,3,3-hexafluoropropane), $CF_3CHFCF_2H$ (HFC-236 EA, 1,1,1,2,3,3-hexafluoropropane), and $CH_2FCF_3$ (HFC-134A, 1,1,1,2-tetrafluoroethane).

The solvent used in the process of the present invention may be a mixture of the above solvents in order to tailor the boiling point of the mixture to a particular extraction process and facilitate the selective elution of specific flavor/fragrant substances or pharmaceutically active ingredients.

The vapor pressure of those solvents at room temperature is greater than atmospheric pressure. For example, the vapor pressure of R 134 A solvent at room temperature (20° C.) is 5.6 bar, and although it must be handled in equipment which is capable of tolerating such pressures, this equipment is a fraction of the cost of equivalent equipment required for the handling of super critical $CO_2$ and a fraction of the degree of sophistication or hazard inherent in plant for handling liquefied hydrocarbon gases under pressure.

By carefully designing such process plant, the non-chlorinated fluorinated hydrocarbon solvent may be recovered from the extraction process and from solutions of fragrant oils, with very high levels of efficiency. In a preferred embodiment, the extraction process is a continuous process and may be performed using a Soxhlet extractor or the like.

It is possible to design a plant suitable for carrying out the method of the present invention which is robust, reliable and portable. In addition, it is very easy to vary the starting materials used in the process and the plant may be sequentially charged with a variety of appropriate starting materials according to demand.

The entire process of extraction using the solvents of the present invention is frequently but not always carried out at or below room temperature. The non-chlorinated fluorinated hydrocarbon solvent generally boils off before the desired volatile components and it is therefore not necessary to elevate the temperature of distillation of the solution during the solvent recovery phase of the process. Of equal importance is the fact that extracts produced in this manner contain very low levels of solvent residues, often 0.02 ppm or less. In contrast, extraction with dichloromethane typically leaves solvent residues of 100 times this level.

The solvents used in accordance with the invention are excellent for the economical extraction of high quality fragrant oils and flavors from fresh flowers, herbs and the like and are chemically inert and non toxic. Unlike carbon dioxide, the fluorinated hydrocarbons are not acidic.

Table 1 below illustrates some materials which may be extracted by the method of the present invention using R 134 A as the solvent. R 134 A is not flammable and has a boiling point of −26° C. at atmospheric pressure.

TABLE 1

Natural materials which may be used in accordance with the invention

| | |
|---|---|
| Flowers (freshly gathered or frozen @ −25° C.) | Herbs (fresh leaf and stems) |
| Roses (various 30+ varieties) | Nicotiana Tobacum |
| | Parsley |
| Tuberose | Basil |
| Stocks | Marjoram |
| Nicotiana | Thyme |
| Jonquil | Lovage |
| Carnations | Fennel |
| Garden Pinks (Clove Pinks) | Artemisia Absinthum |
| Orange Blossom | Dill |
| Pumello Blossom | Mint (Pepper) |
| Lemon Blossom | Mint (Spear) |
| Narcissus | Coriander |
| Freesia | Rue |
| Heliotrope | Sage |
| Mignionetre | Oregano |
| Acidanthera | Angelica |
| Azelia | Lemon Balm |
| Lavender | Bay |
| Stocks | Geranium |
| Lily (Regale) | Cat Mint |
| Meadow Sweet | Clary Sage |
| Elder Flower | Tarragon (French) |
| Wall Flower | Tarragon (Russian) |
| Honeysuckle | Rosemary |
| Lily of the Valley | Leek |
| Lipia Citriodora | Chives |
| Philadelphus | |
| Hyacinth | Seeds, Bark, Buds, |
| Datura | Dried Material |
| Tulips | |
| | Apple (Peel) |
| Bulbs And Corms (fresh) | Willow (Bark) |
| | Balsam Popular (Buds) |
| Onions | Coffee (Arabica) |
| Garlic | (Roasted Beans) |
| | Coffee (Robusta) |
| Moulds | (Roasted Beans) |
| | Tea (Black Leaf) |
| Yeasts | Coriander (Seeds) |
| | Cumin (Seeds) |
| Fungi | |
| | Vanilla (Pods) |
| | Black Pepper (Corns) |
| Algae | Paprika |
| | Cayenne |
| Lichens | Cinnamon (Cassia) |
| | Ginger (Root) |
| | Feverfew |

A review of the advantages of R 134 A, for example, shows that it is:—not flammable, of low boiling point (considerably lower than butane), environmentally acceptable and of very low toxicity, easily handled in inexpensive equipment and readily available. Many of these desirable properties are also possessed by the other solvents which may be used in accordance with the present invention. In addition, the yields obtained by the method of the present invention are frequently substantially higher than those obtained by conventional methods. One unexpected advantage of R 134 A in particular is its ability to directly and selectively extract mobile liquid fragrant oils but not solid waxy concretes. It has been found that at ambient or sub-ambient temperatures, R 134 A leaves behind the majority of the waxes and other non-fragrant materials normally extracted with conventional solvents. Furthermore, chemical analyses (for example those based on GC and GCMS) show that extracts obtained according to the present invention contain volatile components which are absent from oils produced by other techniques and are therefore of better quality than extracts obtained by conventional techniques. These findings are all the more remarkable because this class of solvents (non-chlorinated fluorinated hydrocarbons) is considered to exhibit poor solvent properties.

The products obtained by the extraction of fragrant flowers and herbs using such solvents are generally clear mobile liquids at ambient temperatures (20° C.). These liquids contain only small amounts of low molecular weight waxes and hence, may be employed by perfumers directly without further alcohol treatment.

Hitherto, the primary products available from conventional solvent extraction processes (which have previously been referred to as 'pomade' or 'concrete') have not been directly useable by the perfumer. 'Concrete' contains not only the fragrant oils required, but also natural waxes with a wide diversity of molecular weights. Waxes are esters of fatty acids and fatty alcohols and 'pomades' contain lard. Most 'concretes' are waxy semi solid masses, from which 'absolute' fragrant oils must be carefully extracted or separated by means of trituration with alcohol. In order to rid the alcohol of residual dissolved waxes, it has been necessary to chill these alcoholic extracts to temperatures as low as −25° C. to precipitate the waxes, followed by filtration to remove them. Having obtained the filtrate or solution of fragrant oil (or 'absolute') in alcohol, it is then necessary to remove the alcohol from the absolute. This is usually accomplished by distillation, often at reduced pressure. Shaking the alcoholic solution with aqueous solutions of salts, for example sodium chloride, in which the alcohol preferentially dissolves has also been found to leave the fragrant oil or absolute as a layer floating on its surface. As has been discussed above, such treatments of fragrant oils with alcohol followed by alcohol removal inevitably result in loss of quality of the fragrant oils produced, however carefully they are performed. Furthermore, the presence of ethyl alcohol in products at any concentration causes great offence to customers who are devout Muslims. Hence, it is necessary to be very rigorous in order to rid 'absolute' fragrant oils of their final traces of ethyl alcohol when supplying such products to Muslim countries. This treatment therefore causes severe damage to the final absolute flavor or fragrance.

The use of non-chlorinated fluorinated hydrocarbons as solvents in accordance with the present invention obviates this complication totally since no alcohol is needed in order to render the products of extraction of fragrant flowers directly useable by the perfumer as fully finished flavor or fragrant oils.

In addition, the fluorinated hydrocarbons of the present invention allow selective extraction of the desired components from the raw material; this is in contrast with conventionally used solvents which do not enable such selectivity. Thus, when the temperature of the fluorinated hydrocarbon solvent entering the reactor is high (say 40° C.) more than just oils can be extracted, for example an oleo-resin can be extracted from ginger using high solvent temperatures.

Also, if frozen raw materials are used (at temperatures down to −25° C.) very light oils may be extracted. By purposely cooling (refrigerating) the influent solvent stream it is envisaged that very volatile materials e.g. gases only, may be selectively extracted.

Thus, in one embodiment of the invention a variety of products may be sequentially obtained from a single raw material by varying the operating parameters of the process.

The invention will now be illustrated by means of the following examples which are not intended to limit the scope of the invention in any way.

EXAMPLE 1

50 kg of freshly picked *Rosa Damascena Triglentipetala* were introduced into a stainless steel extractor, having the shape of a flanged tube and of 180 liters capacity, furnished with removable end caps, each of which comprised a plate and a sheet of stainless steel mesh of 200 μ pore size secured thereon to form a filter. The end caps or plates were also equipped with a port which was capable of closure and through which both gases and liquids could pass via the 200 μ stainless steel filter mesh.

The extractor was closed and air was pumped out to a pressure of less than 40 mbar. A source of supply of liquid tetrafluoroethane was connected to the extractor and liquid solvent was allowed to pass to the extractor. The contents of the extractor were bathed in 67 kg (50 liters) of R 134 A. The extractor was sealed as the source of R 134 A was disconnected. The extractor was then tumbled on its lateral axis for two hours to ensure intimate contact between the solvent and the roses.

After two hours, the tumbling was stopped and the outlet was connected via alternative pipework to a small evaporator of 50 liters capacity which had itself previously been evacuated to a pressure of 40 mbar. The solution of rose oil in the R 134 A solvent was allowed to pass intermittently from the extractor into the evaporator, to retain a level of liquid and a gas filled headspace in the evaporator. The evaporator was then connected to the inlet of a compressor which was allowed to withdraw R 134 A gas from the head space of the evaporator and to compress the gas (on its outlet side) to a pressure in excess of 5 bar.

At this pressure, and at room temperature, the gas reliquefied and could either be recycled to the extractor to flush out residual rose oil or be reintroduced to the original reservoir of solvent for re-use on a further batch of fresh flowers.

Inevitably, during this process the evaporator cooled to very low temperatures and it was desirable to immerse it in a water bath furnished with an immersion heater and a thermostat. The thermostat was set to activate the immersion heater when the water temperature fell to 10° C. and to switch off the heater whenever the temperature of the water exceeded 12° C. In this manner, the evaporator may be operated at about 10° C. and the vapor pressure is 1 to 3 bar at the compressor inlet.

The pressure contained in the evaporator throughout this process was in the region of 30 psi. Once all the solution had passed from the extractor to the evaporator, and all the solvent from both the extractor and the evaporator had been evaporated, the vapor pressure inside the evaporator began to fall.

When this pressure had fallen to just above 0 psig an outlet on the bottom of the evaporator was opened and the rose oil solute was allowed to run into a suitable receptacle. Weighing of the receptacle before and after the introduction of the rose oil revealed that 50 gms of rose oil had been removed from the extractor (a yield of 0.1%).

The rose oil obtained was a clear, mobile amber liquid with an excellent aroma characteristic of roses.

Following the removal of the rose oil, the compressor was allowed to continue to suck residual solvent vapor from the extractor and from the roses within it. By the time the pressure within the extractor had fallen to 100 mbar over 99.9% of the R 134 A solvent had been returned to the original reservoir. However, in order to improve the recovery of solvent from 99.9% to 99.99% it was found necessary to heat the extractor and its contents which would otherwise cool, resulting in the vapor pressure of the solvent being lowered at the input to the compressor hence reducing its efficiency.

EXAMPLE 2

Some 2400 brown dried vanilla pods were frozen and roughly chopped into pieces approximately 2 mm$^3$ in size. The weight of chopped vanilla pods after thawing was 6500 gms. This material was introduced into the extractor and treated with 20 liters of R 134 A following the removal of air from the extractor.

After tumbling as in the previous example, the solution was allowed into the evaporator and the solvent removed exactly as described previously.

Three identical extractions using 20 liters of fresh solvent in each case yielded a total of 450 g of a pale yellow clear oil of characteristically vanilla aroma and flavor. This represented a yield of approximately 7%. On standing, white crystals were seen in this oil which were found to consist almost entirely of natural vanillin.

EXAMPLE 3

10 kilos of dried, kibbled ginger root imported from Nigeria were loaded into an extraction chamber of 30 liters capacity. The air was removed in the usual way. R134A was allowed to percolate through the bed of raw material at a temperature of between 15° and 16° C. as the solvent.

Examination of the solute removed after 2½ hours of such extraction revealed a yellow clear mobile oil with a very powerful ginger fragrance. The yield was 4.5% w/w. Organoleptic analysis of this oil at a later date revealed that it was not so powerfully "hot" as commercially available ginger extracts, but was much more heavily scented.

Continuing to extract the ginger raw material with a flow of solvent at 25° C. for a further two hours provided a solute which was darker yellow/brown and a great deal more viscous. The yield was 3.7% w/w.

A further period of 2 hours during which the same raw material was treated with a flow of solvent at a temperature of 40° C. yielded a dark brown very viscous tar-like solute material (yield 2.8% w/w).

Both the later solutes were assessed organoleptically; the second solute had less ginger fragrance but was "hotter" than the first. The third solute (referred to as ginger oleoresin) had almost no ginger aroma, but was exceedingly "hot".

In summary, the process of the present invention can be applied to a wide variety of plants, flowers, herbage, bulbs, seeds and vegetables. The process does not require the use of elevated temperatures or high pressure, thereby avoiding damage to the extracted products and the need for costly equipment. The process uses less electricity than conventional processes, does not require the use of running water or drainage and may be effected in equipment of only modest capital cost and yet which still returns a substantially greater yield of extracted products than conventional processes.

I claim:

1. A process for selectively extracting at least one natural organic component which is soluble in tetrafluoroethane from natural organic material containing the natural organic component, the process comprising
    a) contacting the organic material in a vessel with liquid tetrafluoroethane solvent to dissolve the at least one organic component in the solvent
    b) separating the solution of the at least one natural organic component in the solvent from the remaining organic material; and
    c) removing the solvent to isolate the at least one natural organic component.

2. The process of claim 1 wherein the tetrafluoroethane is 1,1,1,2-tetrafluoroethane.

3. The process of claim 2, wherein a solvent mixture containing the tetrafluoroethane is used to facilitate the selective dissolution of the at least one natural organic component.

4. The process of claim 2, wherein the material which is dissolved in the solvent is varied by varying the operating parameters of the process.

5. The process of claim 2, wherein the at least one organic component is a flavor or fragrance component.

6. The process of claim 2, wherein the process is conducted at a temperature no greater than about ambient temperature and in the substantial absence of air.

7. The process of claim 2, wherein the maximum pressure in the vessel in step a) reaches about 5.6 bar.

8. The process of claim 2, wherein the solvent is removed in step c) by evaporation to leave a solvent residue in the at least one natural organic component of no greater than about 0.02 ppm.

9. The process of claim 2, wherein the solvent further comprises at least one co-solvent.

10. The process of claim 2, wherein the temperature of the materials contacted in step a) is between −25° C. and 40° C.

* * * * *